UNITED STATES PATENT OFFICE.

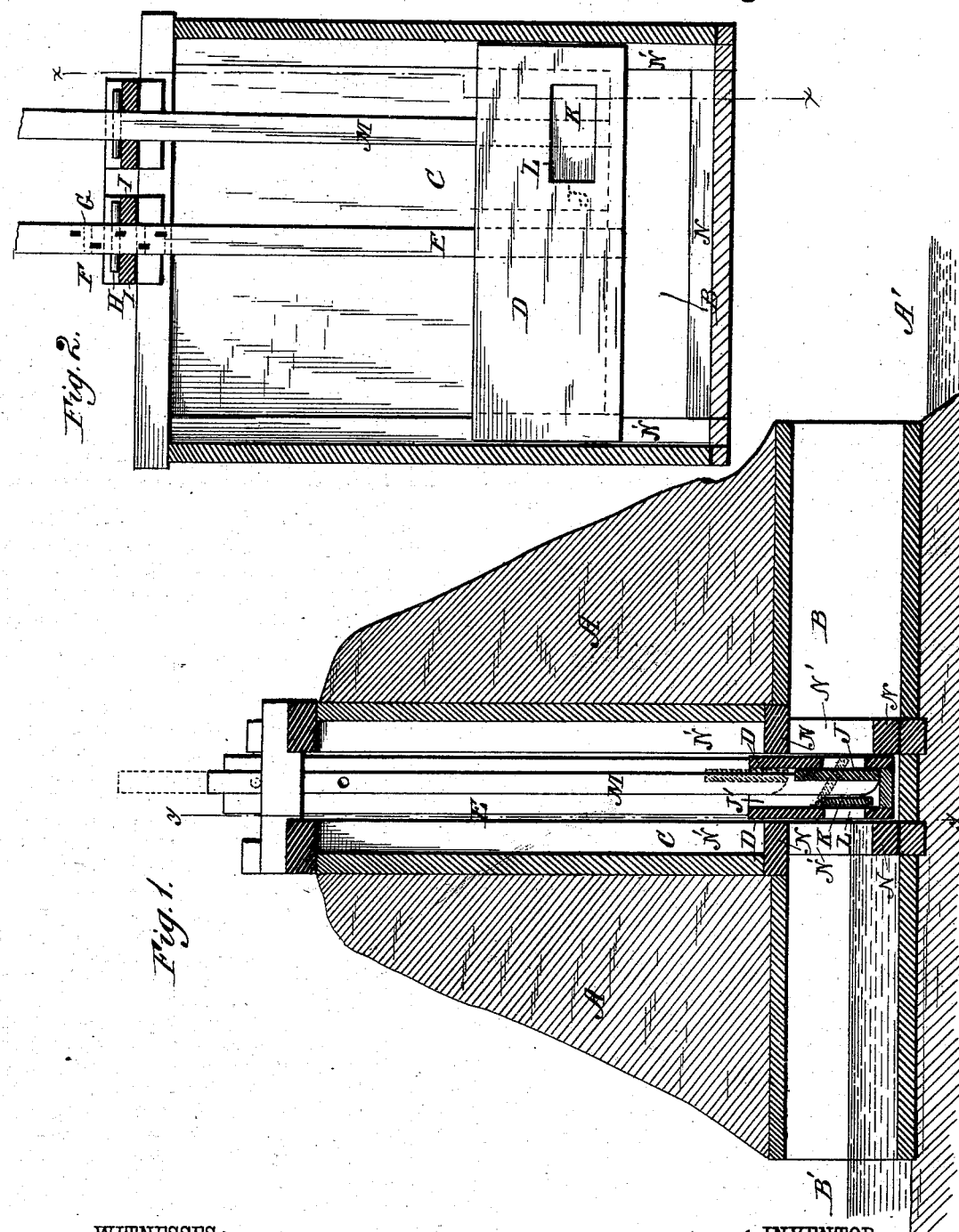

WILLIAM S. MALLARD, OF DARIEN, GEORGIA.

RICE-FIELD TRUNK AND GATE.

SPECIFICATION forming part of Letters Patent No. 283,264, dated August 14, 1883.

Application filed March 16, 1883. (No model.)

*To all whom it may concern:*

Be it known that I, WILLIAM S. MALLARD, of Darien, in the county of McIntosh and State of Georgia, have invented a new and useful Improvement in Rice-Field Trunks and Gates, of which the following is a full, clear, and exact description, reference being had to the annexed drawings, forming part of this specification.

This invention relates to water-gates through which rice-fields are flooded and drained in the process of irrigating the soil; and the invention consists of the novel construction hereinafter described and claimed.

In the drawings, Figure 1 is a cross-section of a levee, showing my invention in section on line $xx$ of Fig. 2; and Fig. 2 is a section of the invention on line $yy$ of Fig. 1.

A indicates a levee, under and through which is located the trunk B for the passage of tide-water at A' into an adjoining rice-field at B'. At the upper part of the trunk, preferably at the center of the levee, is an upright chamber, C, which communicates with the passage through the trunk, and in which is fitted a vertically-movable gate, D, adapted to close the said passage when let down.

The gate is provided with a standard, E, projecting above the top of the levee, which is provided with recesses F, in which the end of a lever may be inserted for prizing up the gate, and by means of a series of perforations, G, in the standard, and a pin, H, adapted to be placed in one of the perforations and supported on cross-bars I, the gate may be held in any raised position desired. When the tide-water has flooded the rice-field through the open passage, and the gate is then let down, the water may be allowed to drain off gradually by raising the slide J, which is fitted to move vertically in chamber J' in the gate D behind a hinged valve, K, and adjusting it at any desired height, so that the valve K, which is hinged in the opening L through the gate D, may be forced back against the lower edge of the slide. The slide J, when down, is adapted to hold the valve closed and prevent the water from escaping.

The slide J is provided with a standard, M, which, being light, may be easily raised by hand, and which is adapted to be supported in a raised position by means of a pin in the manner of the standard E.

The gate D is fitted to slide loosely between the guides N N', which leaves sufficient space for the water to rise up between the gate and its guides at the side of the gate next to the body of water bearing against the same.

When the tide is at a level higher than it is desirable that the field should be flooded, the pressure of the tide against the closed gate will force the latter against its guides at the opposite side and allow the water to pass up at the nearest side of the gate into the chamber C to the height of the tide without, and the weight of this water in the chamber C, resting on top of the gate, or in its chamber J', will hold the gate down against the action of the tide, thus forming a tight joint and preventing too great a flooding of the field. In the same manner, if the field is to be flooded to a height reaching above the top of the gate, leakage of the gate will be prevented by the water entering the chamber C to the level of that in the field and forming a tight joint in the manner above described.

What I claim is—

1. The combination of the trunk having the upright water-receiving chamber, communicating with the passage through the trunk, and the gate fitted in and adapted to be moved vertically in said chamber, and having a hinged part adapted to open the passage through the trunk when the gate is down, substantially as shown and described, and for the purpose specified.

2. The combination of the trunk, the gate having an opening therein provided with a hinged valve, and a vertically-movable slide adapted to fit down behind the valve to hold the latter in a closed position, substantially as shown and described, and for the purpose specified.

WILLIAM S. MALLARD.

Witnesses:
 A. G. LYNE,
 SOLON C. KEMON.